United States Patent [19]
Mouri et al.

[11] Patent Number: 5,872,072
[45] Date of Patent: Feb. 16, 1999

[54] CATALYTIC COMPOSITIONS AND A DEODORIZING METHOD USING THE SAME

[75] Inventors: Motoya Mouri, Suita; Hiroyuki Koyou, Warabi; Tatsuro Takeuchi, Moriyama, all of Japan

[73] Assignee: Takeda Chemcial Industries, Ltd., Osaka, Japan

[21] Appl. No.: 572,067

[22] Filed: Dec. 14, 1995

[30] Foreign Application Priority Data

Dec. 26, 1994 [JP] Japan ................................. 6-338111

[51] Int. Cl.⁶ .................................................. B01J 27/18
[52] U.S. Cl. ........................ 502/208; 502/213; 502/214; 502/216; 502/340; 502/343; 502/344; 502/345; 502/347; 502/349; 502/350; 502/405; 502/406; 502/407
[58] Field of Search ...................... 502/208, 213, 502/214, 216, 340, 343, 344, 345, 347, 349, 350, 405, 406, 407; 423/239.1

[56] References Cited

U.S. PATENT DOCUMENTS 4,623,437  11/1986  Visca et al. ...................... 204/157.47
4,666,945   5/1987  Osugi et al. ........................... 518/713
5,234,884   8/1993  Mouri et al. ........................... 502/405

FOREIGN PATENT DOCUMENTS

1-218635   8/1989  Japan .
1-232966   9/1989  Japan .
6154592    6/1994  Japan .
7000813    1/1995  Japan .

*Primary Examiner*—Shrive Beck
*Assistant Examiner*—Timothy Meeks
*Attorney, Agent, or Firm*—Wenderoth, Lind & Ponack, L.L.P.

[57] ABSTRACT

A malodorous component is eliminated using a catalytic composition comprising a phosphate of a tetravalent metal (titanium or other Group 4 elements of the Periodic Table of Elements), a hydroxide of a divalent metal (copper, zinc or other transition metal), and a photocatalyst. The photocatalyst includes sulfide-semiconductors, oxide-semiconductors and other photo-semiconductors, e.g. titanium oxide. The composition may further contain silicon dioxide and/or a silver component. The catalytic composition insures efficient elimination of not only acidic components and basic components but also neutral components over a long period, irrespective of with or without a light irradiation.

18 Claims, 1 Drawing Sheet

CATALYTIC COMPOSITIONS AND A DEODORIZING METHOD USING THE SAME

FIELD OF THE INVENTION

The present invention relates to a catalytic composition which is useful for decomposition and removal (elimination) of malodorous components and other harmful components, and to a deodorizing method using the catalytic composition.

BACKGROUND OF THE INVENTION

Unpleasant malodors are derived from various sources, for example, daily environments, a variety of institutions such as factories, excrement (human waste) treating plants, waste disposal plants, cattle breeding farms (animal quarters) and others, and cause a malodor pollution.

As the substances or sources which cause such malodors, there may be mentioned a large number of compounds, for instance, nitrogen-containing compounds such as ammonia, amines (e.g. trimethyl amine, triethylamine, etc.), sulfur-containing compounds such as hydrogen sulfide, mercaptans (e.g. methyl mercaptan, etc.), aldehydes (formaldehyde, acetaldehyde, etc.), lower fatty acids (formic acid, acetic acid, propionic acid, valeric acid, etc.) and so on.

For removal of such malodorous components, an activated carbon is generally employed. However, the activated carbon, as it is, is deficient in an adsorption capacity relative to ammonia and other nitrogen-containing compounds, and to hydrogen sulfide and other sulfur-containing compounds. For this reason, an adsorbent (adsorbing agent) comprising an activated carbon supporting a halide, a metal ion, an acid, an alkali or others has been proposed. Such adsorbent, however, does not exhibit a sufficient deodorizing capability yet.

Further, zeolite, silica gel, an activated alumina and the like are also utilized as deodorizing agents. They are, however, deficient in adsorption capacity. In addition, inorganic adsorbents such as a zinc oxide, a magnesium oxide, an iron oxide, an iron hydroxide and others are also employed, but these adsorbents have insufficient adsorptivities to ammonia gas, although they are capable of, and suitable for adsorption and/or removal of hydrogen sulfide. Contrary to this, a zirconium oxide, a zirconium phosphate, a titanium oxide and the like are deficient in adsorption capacity to hydrogen sulfide, although they are excellent in adsorption of gaseous ammonia.

As described above, conventional deodorants and adsorbents are effective to either one of an acidic component or a basic component, but exhibit an insufficient deodorizing effect for the other component [see for example Japanese Patent Application Laid-open Nos. 47445/1989 (JP-A-64-47445), 51421/1980 (JP-A-55-51421), 137089/1978 (JP-A-53-137089), 156539/1983 (JP-A-58-156539), 146578/1984 (JP-A-59-146578), 22074/1988 (JP-A-63-22074), 148340/1989 (JP-A-1-148340), 151938/1989 (JP-A-1-151938), 203040/1989 (JP-A-1-203040), etc.]

Japanese Patent Application Laid-open No. 54935/1988 (JP-A-63-54935) discloses an adsorbent as produced using $TiO_2$, and Japanese Patent Application Laid-open No. 258644/1988 (JP-A-63-258644) discloses a deodorant comprising a mixture of a phosphoric acid or its salt, and iron (Fe), cobalt (Co), nickel (Ni), zirconium (Zr) or a compound of these metals, and a support such as an activated carbon on which the mixture is supported. These adsorbents are, however, insufficient in their adsorptivities (adsorbing capabilities).

WO91/08049 proposes a composition of a mixture of a water-insoluble titanium phosphate and a hydroxide of zinc or others. This composition demonstrates a comparatively high deodorizing capability relative to a malodorous component, but has yet insufficient adsorptivities to neutral malodorous components such as aldehydes.

On the other hand, it is known that a photocatalyst such as a titanium oxide provides deodorization of a malodorous component by oxidation and decomposition with an ultraviolet or other light irradiation. By way of illustration, Japanese Patent Application Laid-open No. 218635/1989 (JP-A-1-218635) discloses a deodorant containing an adsorbent such as an activated carbon, alumina and silica, and a photocatalyst such as a titanium oxide, a zinc oxide and a tin oxide. The purpose of such deodorant is to adsorb and decompose a malodorous component and thus to improve adsorption efficiency, and to insure the deodorizing effect over a long duration.

Further, deodorizing technologies using an oxide mixture containing a titanium oxide have also been proposed. For instance, Japanese Patent Application Laid-open No. 232966/1989 (JP-A-1-232966) discloses a deodorizing method by use of a photocatalyst in which an ultraviolet ray is irradiated in the presence of a mixture of metallic oxides comprising an oxide selected from the group consisting of iron titanate, an iron oxide, a bismuth oxide, a molybdenum oxide and a nickel oxide, and a titanium oxide in coexistence with a gas containing a compound capable of being oxidized and oxygen. Japanese Patent Application Laid-open No. 288321/1989 (JP-A-1-288321) discloses a deodorizing method which comprises, in the presence of a mixture of metallic oxides comprising either of a yttrium oxide or a tin oxide, and a titanium oxide, and a gas containing a compound capable of being oxidized and oxygen, irradiating an ultraviolet ray to the metallic oxide mixture. Japanese Patent Application Laid-open No. 288322/1989 (JP-A-1-288322) discloses a deodorizing method using a photocatalyst in which, in the presence of a mixture of metallic oxides comprising a titanium oxide and a magnesium oxide, and a gas containing a compound capable of being oxidized and oxygen, an ultraviolet ray is irradiated to the mixture of metallic oxides. Japanese Patent Application Laid-open No. 182205/1994 (JP-A-6-182205) discloses a photocatalyst obtained by supporting at least one member of particulates of gold, transition metals and rare earth elements on a metallic oxide such as a titanium oxide, treating the resultant product with ammonia and calcinating the treated product.

Use of these photocatalysts results in such an advantage that decomposition of aldehydes, which are hardly adsorbed, can be realized. They are, however, still insufficient in effects or capabilities as required for adsorbents. Therefore, when deodorization is conducted with the use of such photocatalyst, by-produced compounds associated with oxidation, for example, acetic acid by-produced with oxidation of acetaldehyde and the like, are permitted to release from the adsorbent into air again, and hence they would cause malodors. Further, a sufficient deodorizing effect can not be expected when deodorization is carried out without light irradiations. For this reason, malodorous components containing a neutral component in addition to an acidic component and a basic component can hardly be deodorized or removed completely with the use of the photocatalyst.

SUMMARY OF THE INVENTION

It is, therefore, an object of the present invention to provide a catalytic composition having high removing capabilities not only for an acidic component and a basic component, but also for a neutral component.

It is another object of this invention to provide a catalytic composition which insures an efficient elimination (removal) of a malodorous component over a long period of time.

A further object of the present invention is to provide a catalytic composition which provides an efficient elimination of malodorous components such as hydrogen sulfide or other sulfur-containing compounds and ammonia or other nitrogen-containing compounds, irrespective of in the presence of, or in the absence of light irradiations.

A still further object of the present invention is to provide a production method by which a catalytic composition having such excellent characteristics as mentioned above can be obtained in a simple and easy manner with high efficiency.

It is yet another object of the present invention to provide a deodorizing method by which a variety of components, regardless of being acidic, basic or neutral, can efficiently be removed over a prolonged period of time.

The inventors of the present invention made intensive investigations to accomplish the above-mentioned objects, and found that a combination use of a composition comprising a phosphate of a tetravalent metal and a hydroxide of a divalent metal with a photocatalyst results in an efficient removal of malodorous components over a long period, regardless of being with or without light irradiations. The present invention has been accomplished on the basis of the above findings.

Thus, the catalytic composition of the present invention comprises a phosphate of a tetravalent metal, a hydroxide of a divalent metal and a photocatalyst. The phosphate of the tetravalent metal may practically be a water-insoluble phosphate. The tetravalent metal may be a Group 4 element of the Periodic Table of Elements, for example, a Group 4A element of the Periodic Table of Elements including titanium and so on. The divalent metal may practically be a transition metal such as copper, zinc and the like. The phosphate of the tetravalent metal and the hydroxide of the divalent metal may frequently be amorphous. The photocatalyst may comprise a photo-semiconductor such as a sulfide-semiconductor and an oxide-semiconductor. Such photocatalyst includes, for instance, a titanium oxide and so forth.

The catalytic composition may further comprise a silicon dioxide. Furthermore, the catalytic composition may comprise a silver component together with, or in lieu of, the silicon dioxide.

Such catalytic composition may be produced by, for example, mixing a phosphate of a tetravalent metal, a hydroxide of a divalent metal, and a photocatalyst.

According to the deodorizing method of the present invention, a malodorous component is eliminated or removed by use of the above catalytic composition.

The present invention further relates to a deodorant (deodorizer) and an article comprising the catalytic composition.

It should be understood that the Group numbers of the Periodic Table of Elements as described in this specification are in accordance with the Nomenclature Rule (1970) of the Inorganic Chemistry Nomenclature Commission of the International Union of Pure and Applied Chemistry (IUPAC).

DETAILED DESCRIPTION OF THE INVENTION

The Group in the Periodic Table of Elements to which the tetravalent metal constituting the phosphate belongs is not particularly restricted insofar as the metal is a tetravalent metal. The tetravalent metal includes, for example, Group 4 elements of the Periodic Table of Elements such as Group 4A elements (e.g. titanium, zirconium, hafnium, thorium, etc.) and Group 4B elements (e.g. germanium, tin, lead, etc.). Among these metals, metals belonging to Group 4A elements of the Periodic Table of Elements such as titanium, zirconium and hafnium, and Groups 4B elements such as tin are preferably employed. In particular, titanium and zirconium, as well as tin, can advantageously be used.

As the phosphoric acid which constitutes the phosphate, there may be mentioned a variety of phosphoric acids such as orthophosphoric acid, metaphosphoric acid, pyrophosphoric acid, triphosphoric acid, tetraphosphoric acid and so on. The phosphoric acid may practically be orthophosphoric acid, metaphosphoric acid or pyrophosphoric acid. The phosphate (salt of a phosphoric acid) may also include hydrogenphosphates such as hydrogenorthophosphate. Incidentally, the term "phosphoric acid" as used in this specification means orthophosphoric acid, otherwise particularly specified.

These phosphates of the tetravalent metals are usually insoluble or sparsely soluble in water. Further, the phosphates may be crystalline salts, but they may preferably be amorphous salts. These phosphates can be used singly or in combination.

The divalent metal constituting a hydroxide may belong to whichever of Groups of the Periodic Table of Elements only if it is a divalent metal. As examples of the divalent metal, there may be mentioned copper and other Group 1B elements of the Periodic Table of Elements, magnesium, calcium, strontium, barium and other Group 2A elements of the Periodic Table of Elements, zinc, cadmium and other Group 2B elements of the Periodic Table of Elements, chromium, molybdenum and other Group 6A elements of the Periodic Table of Elements, manganese and other Group 7A elements of the Periodic Table of Elements, iron, ruthenium, cobalt, rhodium, nickel, palladium and other Group 8 elements of the Periodic Table of Elements and so on. Such hydroxides of these divalent metals may be employed independently or in combination.

Preferred examples of the divalent element include transition metals such as copper and other Group 1B elements of the Periodic Table of Elements, zinc and other Group 2B elements of the Periodic Table of Elements, manganese and other Group 7A elements of the Periodic Table of Elements, and iron, cobalt, nickel and other Group 8 elements of the Periodic Table of Elements. Typically preferred divalent metal includes copper, zinc, as well as iron, cobalt, nickel and so forth.

The hydroxides of these divalent metals are, generally, insoluble or sparsely soluble (poorly soluble) in water in a weakly acidic region through a weakly alkalescent (alkaline) region (e.g. pH 4 through pH 10). The hydroxide may be crystalline salts, but they may preferably be amorphous salts.

The proportion of the hydroxide of the divalent metal relative to the phosphate of the tetravalent metal can be selected from a range not sacrificing the catalytic activity, adsorption capabilities and/or deodorizing capabilities for a malodorous component, and is for example such that, in terms of atomic metal ratio, the metal ratio (divalent metal/ tetravalent metal) is about 0.1 to 10, preferably about 0.2 to 7, and more preferably about 0.2 to 5. When plural of the phosphates and/or the hydroxides are used in combination, it is enough if the atomic metal ratio based on the total amount of each metals would be in the above-specified range. Further, the composition comprising the phosphate of the tetravalent metal and the hydroxide of the divalent metal may be compounded or combined, for instance, in the form of a gel mixture by means of coprecipitation or other techniques, and may preferably be an amorphous coprecipitate composition formed by coprecipitation.

A feature of the present invention, in one aspect, resides in a combination use of a composition comprising the phosphate of the tetravalent metal and the hydroxide of the divalent metal (hereinafter, they may simply be referred to as the adsorbent) with a photocatalyst. The catalytic composition comprising such specific combination of ingredients provides a high catalytic activity and insures efficient elimination (removal) of various compounds such as malodorous components over a prolonged period.

The photocatalyst may provably play a role as an photo-oxidizing catalyst by producing an active oxygen on exposure to light irradiations such as ultraviolet irradiations, and hence decomposing or degrading a variety of harmful components and malodorous components. Therefore, the photocatalyst may practically belong to the category of an oxidizing photocatalyst, and thus the catalytic composition of the present invention may also be referred to as an oxidizing catalytic composition. Moreover, the catalytic composition of this invention has algaecidal activities and germicidal activities (bactericidal activities, fungicidal activities) in addition to decomposing capabilities for harmful components and malodorous components.

As the photocatalyst, a variety of photo-semiconductors can be employed regardless of being organic or inorganic substance, but an inorganic photo-semiconductor may practically be used as such photocatalyst. The photocatalyst includes, for instance, sulfide-semiconductors (e.g. CdS, ZnS, $In_2S_3$, PbS, $Cu_2S$, $MoS_3$, $WS_2$, $Sb_3S_3$, $Bi_3S_3$, $ZnCdS_2$, etc.), metallic chalcogenites (CdSe, $In_2Se_3$, $WSe_3$, HgSe, PbSe, CdTe, etc.), oxide-semiconductor ($TiO_2$, ZnO, $WO_3$, CdO, $In_2O_3$, $Ag_2O$, $MnO_2$, $Cu_2O$, $Fe_2O_3$, $V_2O_5$, $SnO_2$, etc.) and so on. Semiconductors such as GaAs, Si, Se, $Cd_2P_3$ and $Zn_2P_3$ may also be included in the scope of the photocatalyst, in addition to the sulfide-semiconductors and oxide-semiconductors. Such photocatalysts may be used singly or in combination.

Preferred photocatalysts among these photocatalysts are CdS, ZnS and other sulfide-semiconductors and $TiO_2$, ZnO, $SnO_2$, $WO_3$ and other oxide-semiconductors. In particular, $TiO_2$ and other oxide-semiconductors can advantageously be employed. There is no particular restriction in a crystal structure of the constituent photo-semiconductor of the photocatalyst. By taking $TiO_2$ as example, it may have whichever type of crystal structure, such as an anatase-type, a brookite-type, a rutile-type, an amorphous-type or others. Preferable example of $TiO_2$ includes an anatase-type titanium oxide.

The photocatalyst may be used in the form of a sol or a gel, as well as in the form of a powder or granule. When a powdery or granular photocatalyst is chosen, the mean particle size of such photocatalyst can be selected from a range not adversely affecting the photoactivity (activity on exposure to a light) and deodorizing efficiency, and is for instance about 0.01 to 25 $\mu$m, preferably about 0.05 to 10 $\mu$m, and more preferably about 0.05 to 5 $\mu$m.

The amount of the photocatalyst may be selected from a broad range, insofar as not sacrificing the catalytic activity, and is, for example, about 1 to 1,000 parts by weight, preferably about 10 to 750 parts by weight and more preferably about 20 to 500 parts by weight relative to 100 parts by weight of the total amount of the phosphate of the tetravalent metal and the hydroxide of the divalent metal.

The catalytic composition comprising the phosphate of the tetravalent metal, the hydroxide of the divalent metal and the photocatalyst may be combined or compounded in a similar manner to the above, for example, as a gel mixture obtainable by coprecipitation or others.

The catalytic composition may further comprise a silicon dioxide. Such incorporation of the silicon dioxide is useful for an increased specific surface area of the catalytic composition and hence for an enhanced adsorption capacity. As the silicon dioxide, there may be mentioned, for instance, an inorganic polymer derived from a silicon dioxide as it is, or an compounded or composite compound such as a compound formed with a silicon dioxide and a phosphate of a tetravalent metal. The silicon oxide may also be a hydrated silicon dioxide. Such silicon dioxide may be crystalline, but preferably be amorphous.

The content of the silicon dioxide may liberally be selected from a range not interfering with the catalytic activity and/or adsorptivities of the catalytic composition, and the ratio of the silicon dioxide relative to the total amount of the phosphate of the tetravalent metal and the hydroxide of the divalent metal is for example such that silicon/(divalent metal +tetravalent metal) ratio is about 0.2 to 10, preferably about 0.5 to 8, and more preferably about 1 to 7, in terms of atomic metal ratio.

The catalytic composition of the present invention may further comprise, in addition to, or in the absence of the silicon dioxide, an antimicrobial metal (for example, silver, copper, zinc and others) component, in particular a silver component. A composition containing a silver component among these antimicrobial metal components has a high antimicrobial activity and a broad antimicrobial spectrum.

The silver component may be a metallic silver, or an inorganic compound of silver (for instance, AgCl, AgF, $AgF_2$ and other silver halides, $Ag_2O$, AgO and other silver oxides, $Ag_2S$ and other sulfides, $Ag_2SO_4$, $Ag_2CrO_4$, $Ag_3PO_4$, $Ag_2CO_3$, $Ag_2SiO_3$ and other oxo acid salts) or others. The silver component may also be a compound formed with the phosphate of the tetravalent metal and silver, or a compound formed with the hydroxide of the divalent metal and silver. The silver component may be water-soluble depending on an intended use of the catalytic composition, but preferred silver component is insoluble or sparsely soluble in water. These silver components may be employed independently or in combination.

The silver component can easily be incorporated into the catalytic composition in a conventional manner such as ion-exchanging, coprecipitation and other techniques.

The content of the silver component is, in terms of metallic silver, about 0.1 to 10% by weight, preferably about 0.5 to 8% by weight and more preferably about 0.5 to 7% by weight based on the total amount of the composition.

The phosphate of the tetravalent metal and the hydroxide of the divalent metal, if necessary with a silicon dioxide, in the catalytic composition of the present invention may preferably form an amorphous composition, in particular, a coprecipitate formed by coprecipitation, among others. The catalytic composition of the present invention has a BET (Brunauer-Emmett-Tellar equation) specific surface area of, usually, about 10 to 1,000 m²/g, preferably about 30 to 1,000 m²/g, and more preferably about 50 to 1,000 m²/g. Therefore, the catalytic composition of the present invention plays a role as an adsorbing composition having a high adsorbability as well as a role as a deodorizing composition for decomposing and eliminating a variety of compounds (organic or inorganic compounds) including malodorous components.

The composition of the invention is obtainable in accordance with various conventional technologies. By way of illustration, the catalytic composition can easily be obtained by mixing the phosphate of the tetravalent metal, the hydroxide of the divalent metal and the photocatalyst, where necessary together with the silicon dioxide and/or the silver component. In such mixing, each component may be used in the form of a powder or granule obtainable by pulverization or other technique.

The catalytic composition of the present invention can also be prepared according to a technique which comprises using a solution containing a tetravalent metal ion, a divalent metal ion and an ingredient corresponding to the photocatalyst, or an aqueous solution containing two or more species of these metal ions to produce a mixture of precipitates of the corresponding water insoluble substances. Such precipitation mixture obtained in the above manner is, usually, in the form of a gel, and drying of the mixture provides a mixture having an amorphous structure. In this technique, the corresponding ingredient to the photocatalyst may preferably be added to an aqueous solution in the form of an adequate crystal structure which has previously been converted.

For preparing an aqueous solution containing a tetravalent metal ion, a divalent metal ion and a silver ion, a variety of water-soluble metallic compounds may be employed. As the water-soluble metallic compounds of the divalent metal, tetravalent metal and silver, there may be mentioned, for example, various metallic salts, metallic alkoxides and so forth. The metallic salt includes, in addition to normal metal salts (normal salts), acidic salts, oxysalts and other metallic salts in the form of double salts or complex salts. The metal salt may also be a compound which is insoluble in around neutral region of a pH value of the aqueous solution, only if it is soluble in an acidic solution. As practical examples of the metallic salt, there may be mentioned the following compounds.

(1) Metallic halides such as fluorides, chlorides, bromides and iodides:

$CoCl_2$, $NiCl_2$, $CuCl_2$, $ZnCl_2$, $FeF_2$, $FeCl_2$, $FeBr_2$, $FeI_2$, $Na_2(SnF_6)$, $K_2(SnF_6)$, $K_2(SnCl_6)$, $CaCl_2$, $CrCl_2$, $BaCl_2$, $MgCl_2$, $MnCl_2$, $TiCl_4$, $SnCl_4$, $ZrCl_4$, $ThCl_4$, $ThI_4$, $PbCl_4$, $GeCl_4$ and the like.

(2) Sulfates, ammonium sulfates and other salts with sulfuric acid (inorganic acid salts):

$FeSO_4$, $CoSO_4$, $(NH_4)_2Fe(SO_4)_2$, $ZnSO_4$, $CdSO_4$, $Ag_2SO_4$, $CrSO_4$, $CuSO_4$, $NiSO_4$, $MgSO_4$, $MnSO_4$, $K_2Co(SO_4)_2$, $(NH_4)_2Mn(SO_4)_2$, $Zr(SO_4)_2$, $Sn(SO_4)_2$, $Th(SO_4)_2$, $Pb(SO_4)_2$, $Ti(SO_4)_2$, etc.

(3) Nitrates (inorganic acid salts):

$Zn(NO_3)_2$, $Co(NO_3)_2$, $Cd(NO_3)_2$, $Ca(NO_3)_2$, $AgNO_3$, $Fe(NO_3)_2$, $Cu(NO_3)_2$, $Ni(NO_3)_2$, $Ba(NO_3)_2$, $Mn(NO_2)_2$, $Zr(NO_3)_4$, $Ti(NO_3)_4$, $Sn(NO_3)_4$, $Th(NO_3)_4$ and so forth.

(4) Chlorates, perchlorates, thiocyanates, diamminesilver sulfates, diamminesilver nitrates, chromates and other various inorganic acid salts:

$Zn(ClO_3)_2$, $Ca(ClO_3)_2$, $Ag(ClO_3)_2$, $Ba(ClO_3)_2$, $Ca(ClO_4)_2$, $AgClO_4$, $Fe(ClO_4)_2$, $Ni(ClO_4)_2$, $Ba(ClO_4)_2$, $Mg(ClO_4)_2$, $Co(ClO_4)_2$, $Zn(SCN)_2$, $Ca(SCN)_2$, $CaCrO_4$, $AgCrO_4$, $Ag_2CO_3$ and so on.

(5) Acetates, formates, oxalates and other organic acid salts:

$(CH_3CO_2)_2Zn$, $(CH_3CO_2)_4Zr$, $C_2O_4Co$, $(CH_3CO_2)_2Co$, $(CH_3CO_2)_2Fe$, $(CH_3CO_2)Cu$, $(CH_3CO_2)_2Ni$, $(CH_3CO_2)_2Ba$, $(CH_3CO_2)_2Mg$, $(CH_3CO_2)Ag$, $(C_2O_4)_2Th$, etc.

(6) Oxysalts of metals (oxysalts of metals in the form of halides, inorganic acid salts and organic acid salts):

$ZrOCl_2$, $ZrOSO_4$, $ThOCl_2$, $TiOSO_4$, $ZrO(NO_3)_2$, $ZrOCO_3$, $(NH_4)_2ZrO(CO_3)_2$, $ZrO(CH_3CO_2)_2$ and so forth.

(7) Metallic alkoxides:

$C_{1-6}$ alkoxides such as $Zr(OCH_3)_4$, $Ti(OCH_3)_4$, $Zr(OC_2H_5)_4$, $Ti(OC_2H_5)_4$ and so on.

Among these metallic compounds, inorganic acid salts, in particular strong acids such as sulfates and nitrates, may practically be employed. In more detail, $FeSO_4$, $Ti(SO_4)_2$, $ZnSO_4$, $CUSO_4$, $AgNO_3$, $Cu(NO_3)_2$ and the like are frequently be used. As the titanium compound and zirconium compound among these tetravalent metallic compounds, there may practically be employed oxysalts of metals such as $ZrOCl_2$, $ZrOSO_4$, $TiOSO_4$ and the like.

The photocatalyst can be prepared according to conventional technologies, for example, a technique comprising preparing it with the use of an aqueous solution containing a metal ion corresponding to the photocatalyst, a technique comprising preparing it from a metallic alkoxide or a gas-phase method which comprises oxidizing a raw material at a high temperature.

In preparation of the photocatalyst, a compound containing an ingredient corresponding to the catalyst may be used. Taking a titanium oxide as an example, such component includes titanium halides such as $TiCl_4$, $TiF_4$, $TiBr_4$, etc.; sulfates such as $Ti(SO_4)_2$ and $TiOSO_4$; titanium $C_{1-6}$ alkoxides such as $(CH_3O)_4Ti$, $(C_2H_5O)_4Ti$, $[CH_3(CH_2)_2O]_4Ti$, $[(CH_3)_2CHO]_4Ti$, $[CH_3(CH_2)_3O]_4Ti$, $[(CH_3)_2CHCH_2O]_4Ti$ and the like. Further, a titanium oxide sol previously prepared may also be employed.

As the water-soluble silicate compound as a supply source of a silicic acid ion for silicon dioxide, there may be mentioned alkali metal salts of silicic acid such as sodium silicate, potassium silicate, etc., alkaline earth metal salts of silicic acid such as calcium silicate, barium silicate, etc., ammonium silicate and so forth. The silicon dioxide may not necessarily be soluble in water, and a raw material in other form such as a xerogel of a silicon dioxide (silica gel), a hydrosol or hydrogel thereof can also be utilized. As such silicic acid ion source, use is made of, generally, an alkaline (basic) silicate, preferably an alkali metal salt of silicic acid, a hydrosol or a hydrogel. Sodium silicate can advantageously be used for its cost and handling properties, among others.

The phosphate of the tetravalent metal and the hydroxide of the divalent metal may be prepared by producing a hydroxide of a divalent metal in the presence of a phosphate of a tetravalent metal in coexistence with an ion of a divalent metal. By way of illustration, they may be prepared by (i) a technique which comprises producing a phosphate of a tetravalent metal in an aqueous solution containing a tetravalent metal ion and a divalent metal ion, and then producing a hydroxide of the divalent metal, or (ii) a technique which comprises previously preparing a phosphate of a tetravalent metal in an aqueous solution which does not contain a divalent metal ion, adding an aqueous solution containing such a divalent metal ion to the above solution to form a hydroxide of the divalent metal.

When the composition is prepared using an aqueous solution containing both of a tetravalent metal ion and a divalent metal ion, in coexistence, according to the above technique (i), a precipitation of a phosphate of the tetravalent metal may be formed by adding a phosphoric acid or a phosphate to an aqueous solution comprising a tetravalent metal-containing compound and a divalent metal-containing compound with preventing or inhibiting formation of an insoluble hydroxide of the divalent metal under stirring. In this technique, pH of the aqueous solution containing the tetravalent metal-containing compound and the divalent metal-containing compound, is in an acidic region, for example about pH 0 to 6 (preferably about pH 0 to 4). Where necessary, the pH may be adjusted to an acidic region (e.g. about pH 4 or lower) by adding an acid to the aqueous solution before adding the phosphoric acid or phosphate for preventing the formation of a hydroxide of the divalent metal.

An adequate alkali (base) and/or acid can be used for adjustment of the pH of the aqueous solution. The alkali includes, for example, inorganic bases such as hydroxides of alkali metals or alkaline earth metals (e.g. sodium hydroxide, potassium hydroxide, calcium hydroxide, etc.) and ammonia, and organic bases such as trimethylamine, triethylamine, triethanolamine and so on. As the acid, there may be used, for instance, inorganic acids such as hydrochloric acid, nitric acid, sulfuric acid, etc., and organic acids such as acetic acid, trichloroacetic acid, trifluoroacetic acid, formic acid, oxalic acid and the like.

Examples of the phosphoric acid or phosphate as used for preparation of the insoluble phosphate include orthophosphoric acid, metaphosphoric acid, pyrophosphoric acid, and alkali metal salts of these acids (e.g. sodium salts, potassium salts, etc.), as well as ammonium salts. In more concretely, the phosphate includes, for instance, sodium primary phosphate, sodium secondary phosphate, sodium tertiary phosphate [thereafter these salts may simply referred to as the sodium phosphates (primary, secondary and tertiary)], potassium phosphates (primary, secondary and tertiary), ammonium phosphates (primary, secondary and tertiary), sodium metaphosphate, potassium metaphosphate, sodium pyrophosphate, potassium pyrophosphate and so forth.

In the above technique (i), the produced phosphate of the tetravalent metal may practically be precipitated to a sufficient extent by aging (maturing) or other techniques. For such aging, conventional technologies such as a technique which comprises leaving the solution at room temperature over a long time, a technique comprising leaving the solution with heating at a temperature of not higher than 100° C. over a long period, a technique comprising heating it under reflux and so on.

After completion of aging, the hydroxide of the divalent metal can be obtained by adding an alkali (base) to adjust the pH of the solution to a neutral range such as in pH 4 to 12. The hydroxide of the divalent metal may also be prepared by adding a base and a mixture containing the phosphate of the tetravalent metal and a divalent metal ion, which has been subjected to aging concurrently to a liquid in a neutral range, for instance, in pH 4 to 12. In the above-mentioned pH range, a precipitation comprising a hydroxide of the divalent metal, and the thus-produced precipitation of the hydroxide and the insoluble phosphate of the tetravalent metal are precipitated to form a precipitate (deposit) mixture or a coprecipitate mixture. When the reaction in the preparation of the hydroxide of the divalent metal proceeds so slowly at ambient temperature (room temperature), the reaction system may be heated. If necessary, the reaction may also be carried out at a temperature of 100° C. or higher under pressure. Further, the stirring of the reaction mixture can also be conducted by air-bubbling.

In the technique (ii), a precipitation of the phosphate of the tetravalent metal and the hydroxide of the divalent metal can be prepared according to a manner similar to the technique (i). That is, a phosphate is previously prepared by adding a phosphoric acid or its salt to an aqueous solution which contains a tetravalent metal ion but does not contain a divalent metal ion. A precipitation mixture may also be obtained by, after aging the produced phosphate as necessary, adjusting the pH value to an acidic range (region), for example in pH 4 or lower if required, adding an aqueous solution containing a divalent metal ion (for example, an aqueous solution containing a metallic salt) to the reaction mixture and adjusting the pH to a neutral range, for example in pH 4 or higher. According to this technique, the aging of the phosphate of the tetravalent metal may be completed in a comparatively short time.

The photocatalyst may be incorporated, for example in the form of a powder or granule, into a reaction system for formation of the phosphate of the tetravalent metal and the hydroxide of the divalent metal, or it may be added to the reaction mixture or the produced precipitation after completion of formation of the phosphate and/or the hydroxide.

Furthermore, the photocatalyst may also be formed simultaneously or concurrently with the formation of the phosphate of the tetravalent metal and/or the hydroxide of the divalent metal. The above-mentioned techniques (i) and (ii) can be utilized in the formation of such photocatalyst. Taking a titanium oxide as an example, such titanium oxide can be produced by adding a titanium halide such as a titanium chloride, an inorganic acid salt (e.g. a sulfate such as titanium sulfate) and/or an alkoxide, as necessary, to the reaction system and adjusting the pH of the "reaction" system to a neutral or alkalescent region, "for instance" in about pH 6 to 12.

For preparation of a composition "containing" a silicon dioxide, a silicon dioxide and/or a silicic acid ion species may be added at least in one step of the precipitation formation reaction, or a silicon dioxide may be added to the produced precipitation. In case the silicon dioxide is produced concurrently with the formation of the precipitation, a solution of an alkalescent silicate (e.g. sodium silicate, potassium silicate, etc.) can be used in lieu of the base. When use is made of the silicic acid ion species, a hydrated silicon dioxide can be formed in the reaction system by adjusting the pH to a neutral region, for example in about pH 4 to 12, accompanying with the formation of the hydroxide of the divalent metal.

Regarding the silver component, a catalytic composition containing such silver component can be obtained by, in the similar manner to the "silicon" dioxide, adding a silver component such as an insoluble silver-containing compound and/or a silver ion species to the reaction system at least in one step of the precipitation formation. The silver component such as silver ion can easily be supported on at least one ingredient of the phosphate, hydroxide and silicon dioxide according to a conventional technology such as ion-exchange method, impregnation or others.

Where necessary, the precipitation may be purified in a conventional manner. By way of illustration, a purified catalytic composition can be obtained by filtrating and separating the reaction mixture containing a precipitation such as the precipitation mixture, washing the residue (filter cake) with a washing solvent or washing agent such as warm water or water to remove impurities including, for example, an anion species of a metallic salt, and drying the resultant.

The filtration may be conducted, with the use of a filter paper, a filter cloth or other filtrating means, at ambient temperature and under atmospheric pressure, under a reduced pressure or under a pressure. For such filtration, centrifugal separation, vacuum filtration or other techniques can also be employed. Furthermore, decantation or other washing method may be employed for the washing.

The drying can be carried out by a conventional technology, such as air-drying or drying under heating at a temperature lower than a decomposition temperature of the catalytic composition, for instance not higher than about 400° C., and preferably not higher than about 200° C.

The catalytic composition of the present invention effectively deodorizes, even under a condition without irradiation of a light, acidic malodorous components such as hydrogen sulfide or other sulfur-containing compounds and fatty acids, and basic malodorous components including nitrogen-containing compounds such as ammonia and amines. In addition, on exposure to a light irradiations, the composition insures an enhanced or improved deodorizing activities for acidic malodorous components and basic malodorous components by means of synergetic effects of high adsorptivities and photocatalytic activities of the catalytic composition, and further provides a high deodorizing effect to neutral malodorous components such as formalin, aldehydes and others. Further, oxidized products formed by a function of the photocatalyst (e.g. in case of acetaldehyde, acetic acid is formed) can be adsorbed on the catalytic composition so that release of the malodorous component can be inhibited or prevented and hence the composition insures a high deodorizing efficiency. Moreover, the catalytic composition provides a retained deodorizing effect over a long time due to decomposition activities of the photocatalyst.

Therefore, the catalytic composition insures rapid and prolonged decomposition and deodorization of an malodor or smell of a tobacco comprising various malodorous components such as ammonia or other basic components, acetic acid or other acidic components, and acetaldehyde or other neutral components. The composition is also effective for elimination and deodorization of aldehydes such as formalin (formaldehyde) and acetaldehyde derived from furniture, new synthetic building materials or other sources.

The composition containing an antimicrobial metallic ingredient can be used for conventional antibiotic applications by utilizing its antimicrobial activities. In particular, such composition comprising a water-insoluble silver-containing compound has both deodorizing activities and antimicrobial activities, so that it insures inhibition of growth (propagation) of microorganism and suppression of malodor development, further provides adsorption and elimination of malodorous components.

Thus, according to the method of the present invention, malodorous components are removed or eliminated by using a catalytic composition comprising a phosphate of a tetravalent metal, a hydroxide of a divalent metal and a photocatalyst. Namely, by allowing the malodorous components to contact with the catalytic composition, acidic malodorous components, basic malodorous components and neutral malodorous components can efficiently be eliminated by means of adsorption and/or decomposition (degradation) activities of the composition, or be transformed into other compounds, in particular, into oxidized compounds. Moreover, owing to the adsorptivities of the catalytic composition, release or desorption of a resultant compound of decomposition can be prevented. Particularly, treatment of a fluid (especially a gas) containing malodorous components under light irradiations provides not only an improved deodorizing efficiency but also retention of its high deodorizing activities over a long duration.

In the light irradiations, a ray having a suitable wavelength corresponding to the photocatalyst may be used. The wavelength of the ray may be any of wavelengths only if it excites the photocatalyst, but the ray may practically be ultraviolet radiations, or radiations containing ultraviolet ray. When a titanium oxide is employed as the photocatalyst, a light derived from sunshine or a fluorescent lamp may be sufficient for an effective exhibition of the catalytic activities. Incidentally, the light irradiation may usually be conducted in the presence of an oxygen-containing gas such as oxygen gas or air.

The catalytic composition may be used, as such, as an adsorbent, deodorizer or deodorant, or may be employed in the form of a powder or granule by means of pulverization or other technology. The resultant powder or granule can be granulated and molded into a suitable form, for instance, a spherical (round) form, a granular form or a pellet form. The catalytic composition may also be molded into a honeycomb, a plate (thin plate), a film, a sheet, a fiber or other form, where necessary with the use of a binder. A honeycomb shaped-article comprising the catalyst composition can also be used, for example, as installed in an air purification equipments, an air conditioner or a deodorizing apparatus.

Furthermore, the catalytic composition, if necessary together with a binder, may be supported on a honeycomb, a plate, a film, a sheet or other molded article, a paper, a woven fabric, a nonwoven fabric or other base material by means of coating, impregnating or other technique. By way of example, a powdery or granular catalytic composition may be incorporated or webbed into a paper, coated on a paper or plate-like material, or supported on a bag (sack) made of, for instance, a woven or nonwoven fabric or a corrugated molded article. The catalytic composition can also be employed for coating applications by adding it to a conventional paint and applying the resultant mixture to a variety of base materials.

Such powdery or granular catalytic composition can be supported on an intended product by kneading with a polymer to mold into a variety of molded articles. By way of illustration, a composition comprising a polymer and the catalytic composition may be molded into a polymer film, a sheet, a synthetic fiber or others to form a composite. The kneading of the polymer and the catalytic composition and the shaping (molding) of the kneaded composition can be carried out according to conventional technologies. The kneading temperature for a synthetic polymer and the catalytic composition may be selected in accordance with the species of the synthetic polymer, and is, for example, about 100° to 400° C., and preferably about 150° to 350° C. Such film can be obtained by, for instance, extrusion-molding, blow molding or fluidizing-extending, and the synthetic fiber may be manufactured by dry- or wet-spinning. The molded article can be obtained by injection-molding, extrusion-molding or compression-molding, for example. Since the catalytic composition of this invention has high heat resistance (thermal resistance) and stability, it insures suppression of sacrificing the catalytic activity even when subjected to the molding process, and retains high catalytic activity and deodorizing capabilities even at a high temperature.

As for the polymer, there is no particular restriction, and there may be exemplified as thermoplastic resins including polyethylene, polypropylene and other polyolefins, poly (vinyl acetate), poly(vinyl chloride) and other vinyl polymers, acrylic resins, styrenic resins, polyesters, polyamides, polyurethanes and so on; thermosetting resins such as epoxy resins, vinyl ester resins, phenolic resins, unsaturated polyester resins and the like; engineering plastics, cellulosic resins and so forth.

As described above, since the catalytic composition of the present invention can be molded into a variety of forms (shapes), it can be applied to various products in which deodorization or removal of malodor is required. As such products to which the present invention is applied, there may be mentioned, for example, fibrous products such as fibers, woven fabrics, nonwoven fabrics, carpets, curtains, cloths for closing a chair or others, bedclothes, clothes, blankets, synthetic waddings, towels, pantyhoses and other under wears, diapers or napkins, socks or stockings, gloves and other fibrous article, insoles for shoes, filters for air purification equipments or air conditioners, guard, protector and other sports equipments, sanitary equipments, wall papers, films and sheets, bath tubs and kitchen utensils made of synthetic resins and other articles. In particular, use of curtains, cloths for chairs or wall papers containing the catalytic composition of the present invention insures deodorization of a tobacco smell in a room and other malodors.

Further, among these catalytic compositions, a catalytic composition having an antimicrobial activity can be utilized for broad-ranged various applications such as for microbe proof, insect proof, tick proof and others in addition to deodorization and elimination applications. For example, the above catalytic composition is also effective for prevention or suppression of putrefaction of a water which is utilized circularly, such as a cooling water of a cooling tower, a water-soluble cutting oil and the like. Typically, the composition of the present invention as molded into a honeycomb structure provides passage of a circulating water or other treating water through honeycomb cell holes of the honeycomb structure so that it provides efficient antimicrobial activity (function) and deodorization of a water to be treated.

The catalytic composition of the present invention can be used for a variety of applications such as elimination (deodorization) of living environmental malodors derived from toilets (washrooms), refrigerators, raw garbage and other sources; deodorization and bactericide or fungicide in hospitals, hotels and the like; treatment of $NO_x$ exhausted from cars; decomposition of harmful components and/or malodorous components in animal quarters including cattle quarters, sewage treating plants or water supplies; algaecide, fungicide, bactericide and/or adsorption in fish quarters, lake waters and dams; bactericide or fungicide in water storage tanks, pools and baths; decomposition of leaked crude oils in harbors or ports; decomposition of halogenated hydrocarbons such as trichloroethane discharged from semiconductor factories or other institutions; degradation of pesticides contained in a waste water (drainage) from golf links; elimination or removal of industrial malodors derived from chemical factories and others.

The catalytic composition of the present invention, in which a specific ingredient comprising the phosphate of the tetravalent metal and the hydroxide of the divalent metal is used in combination with the photocatalyst, insures high elimination activities not only for acidic components and basic components but also for neutral components. Further, it provides an effective deodorization of malodorous components over a long period of time. Moreover, the composition insures an efficient removal of hydrogen sulfide or other acidic components, and ammonia or other basic components irrespective of being with or without light irradiations.

In accordance with the production method of the present invention, a catalytic composition having such excellent characteristics as above can easily be obtained with high efficiency by a simple and easy manner of mixing. According to the method of the present invention where the above catalytic composition is employed, various components, regardless of species, i.e. acidic, basic or neutral components, can be removed or eliminated with a high efficiency over a long time.

The following examples are intended to illustrate the present invention in more detail, but should by no means limit the scope of the invention.

EXAMPLES

Example 1

[Cu(II)—Ti(IV)—$SiO_2$—$TiO_2$ composition]

To 1 liter of distilled water was added 43.9 g of a crystal of a copper sulfate ($CuSO_4 \cdot 5H_2O$, guaranteed (special grade) reagent manufactured by Wako Pure Chemical Industries, Ltd.), and the resultant solution was added with 60 g of an aqueous solution of a titanium sulfate (concentration about 30% by weight, reagent manufactured by Wako Pure Chemical Industries, Ltd., Japan) to give a mixture containing 0.175 mol of Cu(II) ions, and 0.075 mol of Ti(IV) ions. The pH of the mixture was approximately 1. With being stirred at room temperature, the mixture was added dropwise with about 110 g of a solution containing 15% by weight of a phosphoric acid to give a white precipitate. The resultant mixture containing the precipitate was further stirred for one day.

While respectively stirring in different beakers, the above mixture containing the precipitate (Mixture A) and 71 g of an aqueous solution containing sodium silicate (Mixture B) were added dropwise, simultaneously, to 500 ml of distilled water in a vessel to form a precipitate mixture of pale color containing Cu(II)—Ti(IV)—$SiO_2$. The amounts of the dropwise-added Mixtures A and B were adjusted to such amounts as to maintain the resultant mixture being in about pH 7.0. While, Mixture B had been prepared by diluting an aqueous solution of sodium silicate (reagent manufactured by Wako Pure Chemical Industries, Ltd., Japan)with distilled water to contain 30% by weight of sodium silicate (0.86 mol as $SiO_2$) and adding 30 ml of an aqueous solution containing 15% by weight of sodium hydroxide to the diluted solution.

The resultant mixture comprising Mixture A and Mixture B was stirred at room temperature for successive 2 hours, and the pale-colored precipitate was separated by filtration under a reduced pressure, and was washed with a warm deionized water thoroughly and dried at 40° C. The dried was pulverized or divided in a mortar into a powder with a diameter of not more than 120 $\mu$m to give a pale powder containing Cu(II)—Ti(IV)—$SiO_2$.

To 80 parts by weight of the above pale-colored powder was added 20 parts by weight of a powdery titanium oxide (Ishihara Sangyo Kaisha, Ltd., Japan, MC-90) to provide a catalytic composition.

Example 2

A catalytic composition was prepared in the same manner as Example 1, except that 50 parts by weight of the titanium oxide powder used in Example 1 was mixed with 50 parts by weight of the pale-colored powder obtained in Example 1.

Example 3

[Cu(II)—Ti(IV)—$SiO_2$—$TiO_2$ composition]

A crystal of a copper sulfate ($CUSO_4 \cdot 5H_2O$, guaranteed reagent (special grade) manufactured by Wako Pure Chemical Industries, Ltd., Japan; 43.9 g) was added to 1 liter of distilled water, and to the resultant solution was added 60.0 g of a titanium sulfate solution (titanium sulfate content about 30% by weight, reagent manufactured by Wako Pure Chemical Industries, Ltd., Japan). The obtained mixture contained 0.175 mol of Cu(II) ions and 0.075 mol of Ti(IV) ions, with a pH of about 1.

To the above mixture was added dropwise about 110 g of a solution containing 15% by weight of a phosphoric acid while stirring the mixture at room temperature to give a white precipitate. The mixture containing the precipitate was further stirred for one day.

With being stirred in different beakers respectively, the mixture containing the precipitate (Mixture A) and 471 g of an aqueous solution containing sodium silicate (Mixture B) were added, side by side, to 500 ml of distilled water in a vessel to give a pale precipitate mixture containing Cu(II)—Ti(IV)—$SiO_2$ (Mixture C). The amounts of the added Mixture A and Mixture B were adjusted so as to maintain the resultant mixture constantly being pH 7.0. Meanwhile, the Mixture B had been prepared by diluting an aqueous solution of sodium silicate (reagent manufactured by Wako Pure Chemical Industries, Ltd., Japan) with distilled water to give a 30% by weight-solution (0.86 mol as $SiO_2$) and adding 30 ml of an aqueous solution containing 15% by weight of sodium hydroxide to the diluted solution.

While, an aqueous solution of sodium hydroxide was added dropwise, with stirring, to a mixture of 80 g of a titanium oxide sol (Ishihara Sangyo Kaisha, Ltd., Japan, CS-N, 30% by weight content as $TiO_2$) and 500 ml of purified water, in such an amount as to give a mixture with a pH of 7.0 (Mixture D).

The Mixture C was mixed with the Mixture D with stirring for 30 minutes, and the produced precipitate was separated by filtration under a reduced pressure, and the separated was washed sufficiently with a warm deionized water and dried at 40° C. The dried product was pulverized in a mortar into particles with diameters of not larger than 120 $\mu$m to give a pale powder of a catalytic composition containing Cu(II)—Ti(IV)—$SiO_2$—$TiO_2$.

Example 4

The procedure of Example 3 was repeated except for using the titanium oxide sol in an amount of 320 g to give a powdery catalytic composition.

Example 5

[Zn(II)—Ti(IV)—$SiO_2$—$TiO_2$ composition]

To 1 liter of distilled water was added 60.0 g of a titanium sulfate solution (concentration about 30% by weight, reagent manufactured by Wako Pure Chemical Industries, Ltd., Japan) to give a mixture containing 0.075 mol of Ti(IV) ions. A solution containing 15% by weight of a phosphoric acid (about 98 g) was added to the above mixture with stirring at room temperature to give a white precipitate. The resultant mixture containing the white precipitate was stirred for 2 hours.

To this mixture containing the precipitate was added 50.3 g of a crystal of a zinc sulfate ($ZnSO_4 \cdot 7H_2O$, guaranteed (special grade) reagent manufactured by Wako Pure Chemical Industries, Ltd., Japan) to give a solution containing 0.175 mol of Zn(II) ions.

To the obtained solution was added dropwise, with stirring at room temperature, 471 g of an aqueous solution of sodium silicate (prepared by diluting a reagent of sodium silicate manufactured by Wako Pure Chemical Industries, Ltd., Japan, with distilled water into a concentration of 30% by weight). A 15%-sodium hydroxide solution was added to the resulting mixture to give a mixture with a pH of 7.0. When the pH of the resultant mixture was decreased even with adding the sodium hydroxide, the sodium hydroxide solution was further added to the mixture for maintaining the pH of the resultant mixture being in about 7.0. As a result of stirring to such an extent as not to observe the decrease of the pH, a white mixture of precipitates containing Zn(II)—Ti(IV)—$SiO_2$ was formed (Mixture A).

Fifty six (56) grams of titanium tetrachloride (guaranteed (special grade) reagent manufactured by Wako Pure Chemical Industries, Ltd., Japan) was added dropwise to the Mixture A, while adding dropwise an aqueous solution containing 15% by weight of sodium hydroxide to the mixture in such an amount as to give a pH of 7.0 to provide a precipitate of a titanium oxide.

The formed precipitate was separated by filtration under a reduced pressure, washed fully with a warm deionized water, and dried at 40° C. The dried product was pulverized in a mortar to give a white powder of a catalytic composition containing Zn(II)—Ti(IV)—$SiO_2$—$TiO_2$ with a particle size of not more than 120 $\mu$m.

Example 6

[Zn(II)—Ti(IV)—$TiO_2$ composition]

A titanium sulfate solution (about 30% by weight in concentration, reagent manufactured by Wako Pure Chemical Industries, Ltd., Japan; 43.7 g) was added to 25.8 g of water to give an aqueous solution containing 0.055 mol of Ti(IV) ions. To the resultant aqueous solution with stirring at room temperature was added dropwise about 53.6 g of an aqueous solution containing 15% by weight of a phosphoric acid to form a white precipitate. The mixture containing the formed precipitate was further stirred for 2 hours.

A crystal of a zinc sulfate ($ZnSO_4 \cdot 7H_2O$, guaranteed (special grade) reagent of Wako Pure Chemical Industries, Ltd., Japan; 6.75 g) was added and dissolved to the above mixture containing the precipitate. The resultant mixture contained 0.023 mole of Zn(II) ions.

To the obtained mixture was added dropwise 15%-sodium hydroxide solution in such a proportion as to give a mixture with a pH of 7.0. Where the pH of the resultant mixture was decreased in such addition of the sodium hydroxide, the sodium hydroxide solution was further added to the mixture to retain the pH of the mixture being in about 7.0. By stirring the mixture to such an extent as not to observe pH decrease, a white precipitate containing Zn(II)—Ti(IV) was formed.

This white precipitate was filtrated and separated under a reduced pressure, washed thoroughly with a warm deionized water, dried at 40° C. and pulverized in a mortar to give a white powder containing Zn(II)—Ti(IV) with a diameter of not larger than 120 $\mu$m.

Thirty (30) parts by weight of a powdery titanium oxide (Ishihara Sangyo Kaisha, Ltd., Japan, MC-90) was added to 70 parts by weight of the white powder containing Zn(II)—Ti(IV). The resulting mixture was pulverized in a jet-mill pulverizer to give a finely divided powder of a catalytic composition comprising Zn(II)—Ti(IV)—$TiO_2$ with a mean particle size of 5 $\mu$m.

Example 7

[Cu(II)—Ti(IV)—$TiO_2$ composition]

A fine powder of a catalytic composition containing Cu(II)—Ti(IV)—$TiO_2$ was prepared in the same manner as Example 6, except that 5.74 g of a copper sulfate ($CuSO_4 \cdot 5H_2O$, 0.023 mol in terms of Cu(II)) was used in lieu of the zinc sulfate $ZnSO_4 \cdot 7H_2O$.

Example 8

[Ag(I)—Zn(II)—Ti(IV)—$TiO_2$ composition]

To 1 liter of distilled water were added 34.5 g of a crystal of a zinc sulfate ($ZnSO_4 \cdot 7H_2O$, guaranteed reagent of Wako Pure Chemical Industries, Ltd., Japan) and 6.8 g of a crystal of a silver nitrate ($AgNO_3$, guaranteed (special grade)

reagent of Wako Pure Chemical Industries, Ltd., Japan) to give a solution. A titanium sulfate solution (about 30% by weight in concentration, guaranteed (special grade) reagent of Wako Pure Chemical Industries, Ltd., Japan; 192.0 g) was added to the above solution to prepare a mixture with a pH of about 1.0 containing 0.04 mol of Ag(I) ions, 0.12 mol of Zn(II) ions and 0.24 mol of Ti(IV) ions.

While stirring at room temperature, about 330 g of a 15% by weight-phosphoric acid solution was added dropwise to the above mixture to form a white precipitate. The resultant mixture containing the white precipitate was further stirred at room temperature, as such, for one day, and was added dropwise with a solution containing 15% by weight of sodium hydroxide, while stirring at room temperature, in such an amount as to give a mixture with a pH of 7.0. As a result, a white precipitate was additionally formed. The mixture was further stirred at room temperature while the resultant mixture being maintained in a pH range of 7.0 by adding a sodium hydroxide solution (15% by weight) when the pH was decreased. The stirring was continued to such an extent as not to observe the pH decrease to give a mixture containing a white precipitate mixture comprising Ag(I)—Zn(II)—Ti(IV) (Mixture A).

To the Mixture A was added dropwise 320 g of a titanium oxide sol (Ishihara Sangyo Kaisha, Ltd., Japan, CS-N, 30% by weight in terms of $TiO_2$), and concurrently, was added dropwise a solution containing sodium hydroxide (15% by weight) to retain the resultant mixture being in pH 7 to give a precipitate mixture of Ag(I)—Zn(II)—Ti(IV)—$TiO_2$.

The produced white precipitate mixture was separated by filtration under a reduced pressure, washed sufficiently with a warm deionized water, and dried at 40° C. The dried product was pulverized in a mortar to give a white powder of a catalytic composition containing ing Ag(I)—Zn(II)—Ti(IV)—$TiO_2$ with a particle size of not larger than 120 μm.

Example 9

[Manufacture of a sheet]

To 10 liter of water were added and homogeneously dispersed 100 g of a pulp and 35 g of the catalytic composition powder obtained in Example 3. A cationized starch (0.7 g) and a polyacrylamide (0.03 g) were added to the resultant mixture to give a gruel pulp slurry. This pulp slurry was paper-webbed using a standard paper making machine for a hand-webbing, and the obtained web was dried to give a sheet (catalytic composition content of 25% by weight, paper weight 140 g/m$^2$). This sheet was pale-blue colored.

Example 10

[Manufacture of a cloth]

The powdery catalytic composition (20 g) obtained in Example 3 was added and homogeneously dispersed into 200 liters of water. The dispersion was transferred to a petri dish, and a cotton cloth (10 cm×10 cm, 2.7 g) was dipped in the dispersion for 10 minutes. The dipped cotton cloth was pulled up from the dispersion and dried at 100° C. for 4 hours to provide a cloth supporting the powdery catalytic composition (catalytic composition content of 0.14 g).

Comparative Example 1

A titanium oxide powder (Ishihara Sangyo Kaisha, Ltd., Japan, MC-90) was used as such.

Comparative Example 2

Eighty (80) gram of a silica powder (silicon dioxide; guaranteed (special grade) reagent of Wako Pure Chemical Industries, Ltd., Japan) and 20 g of a titanium oxide powder (Ishihara Sangyo Kaisha, Ltd., Japan, MC-90) were mixed in a mortar to give a powdery silica-titanium oxide mixture.

Comparative Example 3

A powdery mixture of alumina-titanium oxide was obtained by mixing 80 g of an alumina (aluminium oxide; guaranteed reagent of Wako Pure Chemical Industries, Ltd., Japan) with 20 g of a titanium oxide powder (Ishihara Sangyo Kaisha, Ltd., Japan, MC-90) in a mortar.

The removing capabilities for malodorous components of the powders each obtained in examples and comparative examples were evaluated regarding hydrogen sulfide, ammonia and acetaldehyde, respectively, in the following manner.

That is, 100 mg of a dried powder of the catalytic composition was put in a glass petri dish, and the dish was disposed in a 1 liter-Tedlar-bag and sealed. By using a syringe, air and a malodorous component (hydrogen sulfide, ammonia or acetaldehyde) were injected into the Tedlar-bag with an initial concentration of 100 ppm and a gas volume of 1 liter.

In a dark-conditioned experiment, the Tedlar-bag was disposed on standing in a dark room, and it was allowed to stand at a distance of 15 cm from a 27 W-white fluorescent lamp in an experiment under light irradiations.

A gas was sampled from the Tedlar-bag after a predetermined time was passed from the injection of the gases, and the concentration of the gaseous malodorous component was determined using a gas chromatography (Shimadzu Corporation, Japan, Type GC-14A) to give an elimination ratio of the malodorous component. The results for hydrogen sulfide, ammonia and acetaldehyde are respectively set forth in Table 1. Incidentally, the elimination ratio was calculated according to the following equation.

$$\text{Elimination ratio (\%)}=[(C_0-C)/C_0]\cdot 100$$

wherein $C_0$ represents an initial concentration of the malodorous component and C represents a concentration of the malodorous component in a predetermined time passage from the initial of the experiment.

TABLE 1

| | Elimination ratio of malodorous component (%) | | | | | | | | | | | |
|---|---|---|---|---|---|---|---|---|---|---|---|---|
| | Component | | | | | | | | | | | |
| | Hydrogen sulfide | | | | Ammonia | | | | Acetaldehyde | | | |
| | Dark | | Irradiation | | Dark | | Irradiation | | Dark | | Irradiation | |
| Time course | 30 min. | 60 min. | 30 min. | 60 min. | 1 hr. | 5 hr. | 1 hr. | 5 hr. | 1 hr. | 5 hr. | 1 hr. | 5 hr. |
| Example 1 | 100 | 100 | 100 | 100 | 100 | 100 | 100 | 100 | 15 | 18 | 40 | 98 |
| Example 2 | 100 | 100 | 100 | 100 | 100 | 100 | 100 | 100 | 15 | 18 | 45 | 100 |
| Comp. Ex. 1 | 2 | 5 | 13 | 15 | 100 | 100 | 100 | 100 | 10 | 12 | 40 | 97 |

TABLE 1-continued

| | Elimination ratio of malodorous component (%) | | | | | | | | | | | |
|---|---|---|---|---|---|---|---|---|---|---|---|---|
| | Component | | | | | | | | | | | |
| | Hydrogen sulfide | | | | Ammonia | | | | Acetaldehyde | | | |
| | Dark | | Irradiation | | Dark | | Irradiation | | Dark | | Irradiation | |
| Time course | 30 min. | 60 min. | 30 min. | 60 min. | 1 hr. | 5 hr. | 1 hr. | 5 hr. | 1 hr. | 5 hr. | 1 hr. | 5 hr. |
| Comp. Ex. 2 | 1 | 8 | 9 | 30 | 100 | 100 | 100 | 100 | 5 | 10 | 9 | 33 |
| Comp. Ex. 3 | 1 | 6 | 8 | 28 | 100 | 100 | 100 | 100 | 3 | 8 | 10 | 40 |

As apparent from Table 1, use of the catalytic compositions according to examples insures elimination of a basic malodorous component and an acidic malodorous component even under dark condition (shield from a light), and efficient elimination of a neutral malodorous component with a light irradiation.

Meanwhile, in comparative examples, organoleptic evaluation of deodorization was conducted as follows. Namely, regarding the gas containing hydrogen sulfide after 60 minutes-irradiation, the gas was smelled olfactorily. As a result, a sweet and sour smell was remained in Comparative Examples 1 to 3. As to the gas containing acetaldehyde after 5 hour-irradiation, an odor other than acetaldehyde was smelled in Comparative Examples 1 to 3.

Figure 1:
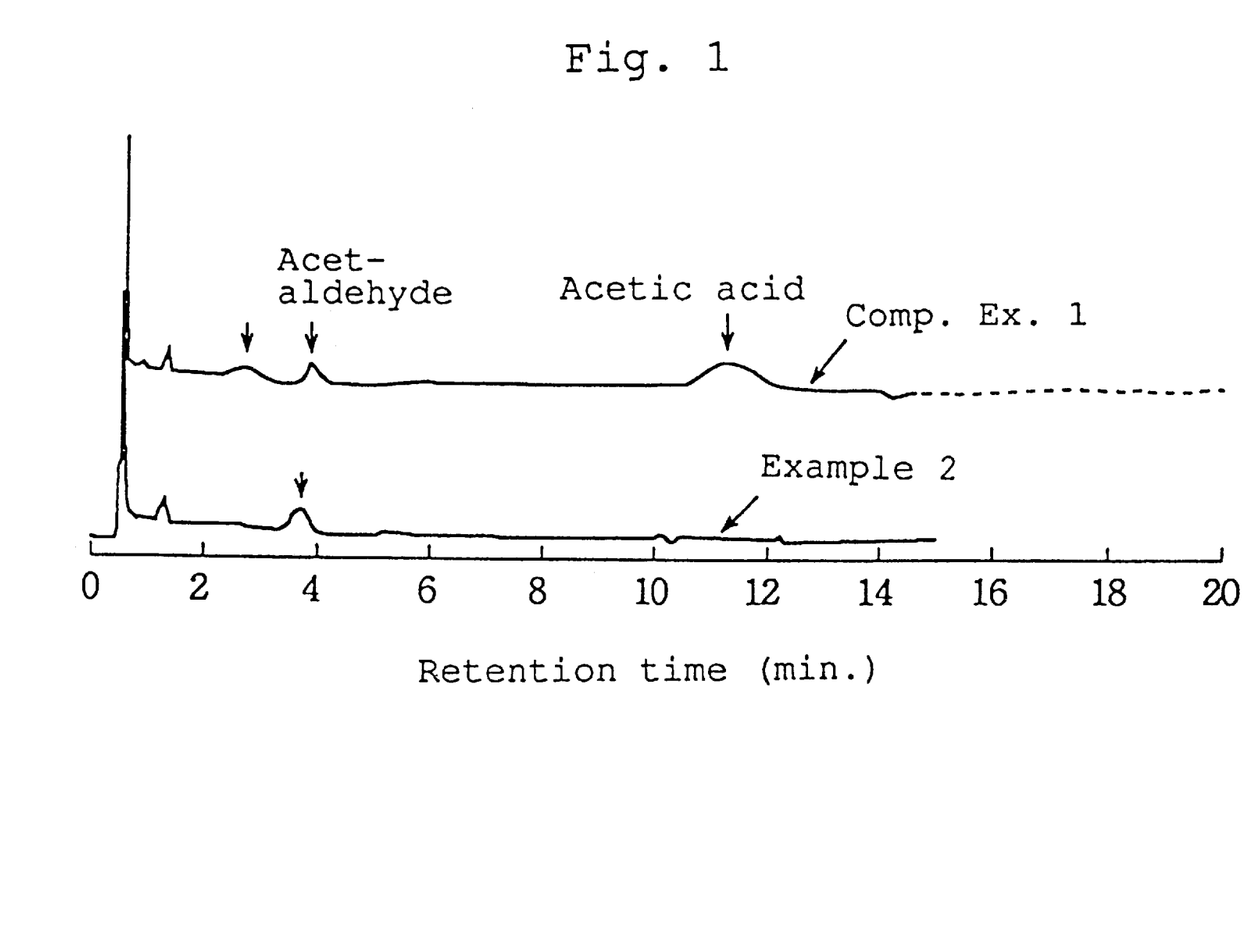
FIG. 1 is a chart illustrating the results of analysis with a gas chromatography in Example 2 and Comparative Example 1.

By way of reference, the results in determination with a gas chromatography for Example 2 and Comparative Example 1 are shown in FIG. 1. As illustrated in FIG. 1, according to Comparative Example 1, a peak of a component which seems to be a decomposed product of acetaldehyde and a peak which is considered to be derived from acetic acid were respectively observed at a retention time of about 3 minutes and a retention time of about 11 minutes. Similar peaks were observed in Comparative Examples 2 and 3.

Example 11

[Manufacture of a sheet]

Two (2) grams of the powdery catalytic composition obtained in Example 6 was added to 15 g of an acrylic acid ester emulsion (Takeda Chemical Industries, Ltd., Japan; Ultrasol™ N-28; solid matter (nonvolatile matter) 45% by weight), and the resultant mixture was stirred and mixed for 10 minutes.

Using a brush, this mixture was coated on a filter paper (Toyo Roshi, Co., Ltd., Japan; trade name ADVANTEC-101), and the coated filter paper was dried to provide a sheet containing 15% by weight of the catalytic composition.

Example 12

[Manufacture of a honeycomb]

To 700 g of the powdery catalytic composition obtained in Example 1 were added 300 g of kibushi clay, 50 g of a molding auxiliary (Takeda Chemical Industries, Ltd., Japan; Biopoly™) and 600 g of water. The resultant mixture was kneaded for 2 hours with the use of a kneader to give a kneaded mixture for extruding.

This kneaded mixture was extruded using a extruder (Honda Tekko Co., Ltd., Japan; type DE-35) into a honeycomb-shaped article of 30 mm×30 mm square (300 cell/square inch). The molded article was cut into a length of 40 mm, and disposed in a petri dish. With covering up, the disposed was dried at 120° C. over a night to give a honeycomb-shaped product.

What is claimed is:

1. A catalytic composition comprising at least one phosphate of a tetravalent metal selected from the group consisting of a phosphate of titanium, a phosphate of zirconium, a phosphate of hafnium, and a phosphate of tin, at least one hydroxide of a divalent transition metal selected from the group consisting of a hydroxide of copper and a hydroxide of zinc, and a photocatalyst comprising titanium oxide.

2. The catalytic composition as claimed in claim 1, wherein said tetravalent metal is titanium.

3. The catalytic composition as claimed in claim 1, wherein the proportion of said hydroxide of the divalent metal relative to said phosphate of the tetravelent metal is such that the atomic metal ratio of divalent metal to tetravelent metal is in the range of 0.1 to 10.

4. The catalytic composition as claimed in claim 1, wherein the proportion of said photocatalyst is 1 to 1,000 parts by weight relative to 100 parts by weight of the total amount of said phosphate of the tetravalent metal and said hydroxide of the divalent metal.

5. The catalytic composition as claimed in claim 1, wherein the ratio of said divalent metal relative to said tetravalent metal is such that the atomic metal ratio of divalent metal to tetravalent metal is in the range of 0.2 to 7, and the proportion of said photocatalyst is 10 to 750 parts by weight relative to 100 parts by weight of the total amount of said phosphate of the tetravalent metal and said hydroxide of the divalent metal.

6. The catalytic composition as claimed in claim 1, wherein said phosphate of the tetravalent metal and said hydroxide of the divalent metal are amorphous.

7. The catalytic composition as claimed in claim 1, which has a BET specific surface area of 10 to 1000 $m^2/g$.

8. The catalytic composition as claimed in claim 1, which comprises said phosphate of the tetravalent metal and said hydroxide of the divalent metal as a coprecipitate.

9. The catalytic composition as claimed in claim 1, wherein the proportion of said hydroxide of the divalent metal to said phosphate of the tetravalent metal is in the range of 0.2 to 7 in terms of atomic metal ratio, and the proportion of said titanium oxide is 10 to 750 parts by weight relative to 100 parts by weight of the total amount of said phosphate of the tetravalent metal and said hydroxide of the divalent metal.

10. The catalytic composition as claimed in claim 1, which further comprises a silicon dioxide.

11. The catalytic composition as claimed in claim 10, wherein the proportion of said silicon dioxide relative to the total amount of said phosphate of the tetravalent metal and said hydroxide of the divalent metal is, in terms of atomic metal ratio, in the range of 0.2 to 10.

12. The catalytic composition as claimed in claim 10, which further comprises a silicon dioxide in a proportion in the range of 0.5 to 8, in terms of atomic metal ratio, relative to the total amount of said phosphate of the tetravalent metal and said hydroxide of the divalent metal.

13. The catalytic composition as claimed in claim 10, which comprises said phosphate of the tetravalent metal, said hydroxide of the divalent metal and said silicon dioxide as a coprecipitate.

14. The catalytic composition as claimed in claim 10, which further comprises a silver component.

15. The catalytic composition as claimed in claim 1, which further comprises a silver component.

16. The catalytic composition as claimed in claim 15, wherein the content of said silver component is 0.1 to 10% by weight, in terms of metallic silver, based on the total amount of the composition.

17. A method of producing a catalytic composition, which comprises mixing at least one phosphate of a tetravalent metal selected from the group consisting of a phosphate of titanium, a phosphate of zirconium, a phosphate of hafnium and a phosphate of tin, at least one hydroxide of a divalent transition metal selected from the group consisting of a hydroxide of copper and a hydroxide of zinc, and a photocatalyst comprising a titanium oxide.

18. The method of producing a catalytic composition as claimed in claim 17, which comprises mixing a precipitate comprising said phosphate of the tetravalent metal and said hydroxide of the divalent metal, with said photocatalyst.

* * * * *